Oct. 8, 1946.  R. L. MALCOM  2,409,140
INDUSTRIAL EYESHIELD
Filed April 29, 1944
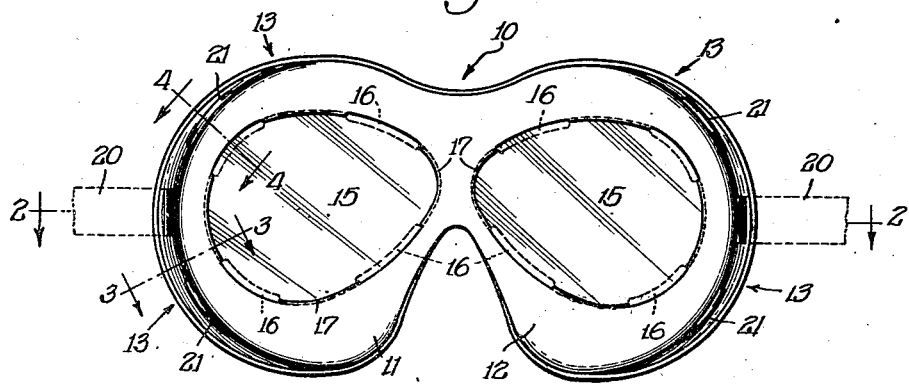
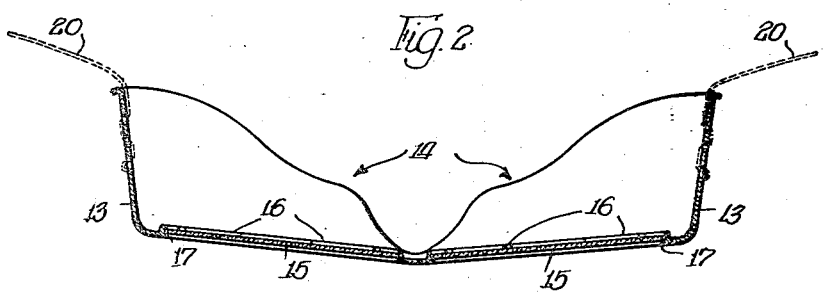
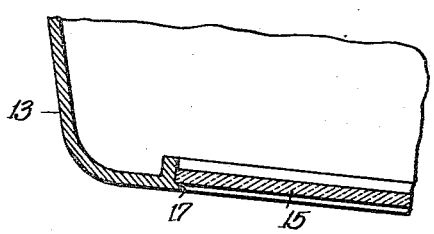 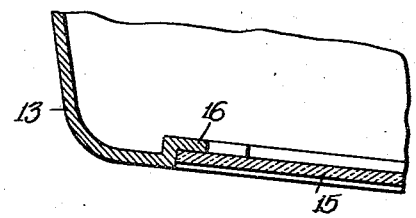
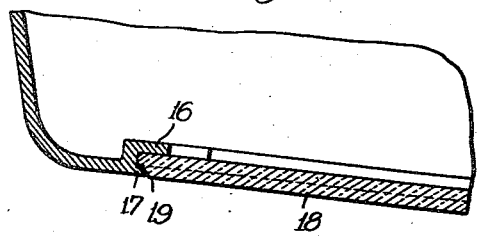
INVENTOR.
Robert L. Malcom,
BY
Cromwell, Greist, Warden & Butler
attys.

Patented Oct. 8, 1946

2,409,140

UNITED STATES PATENT OFFICE 2,409,140

INDUSTRIAL EYESHIELD

Robert L. Malcom, Chicago, Ill., assignor to Chicago Eye Shield Company, Chicago, Ill., a corporation of Illinois Application April 29, 1944, Serial No. 533,305

3 Claims. (Cl. 2—14)

The present invention relates to eyeglass frames and lenses carried therein, having particular reference to an industrial eye shield comprising a flexible molded plastic frame carrying lenses which readily can be snapped into temporarily locked position in suitable openings in the frame and readily removed therefrom, or replaced, and the provision of such an article is a principal object of the invention.

More specifically, it is an object of the present invention to provide an industrial eye shield utilizing a one-piece frame of molded, flexible, plastic material having lens receiving openings therein, the openings having inwardly directed ledges against which marginal portions of one face of each lens can be seated, the openings also having a plurality of inwardly directed projections, staggered with respect to the ledges, to grip marginal portions of the opposite face of each lens in order to receive and to hold the same in position when an area of the frame around the opening and an insertable lens positioned over an opening are flexed with respect to each other so that the lens can be sprung into the opening and positioned therein.

Another object of the invention is the provision of an industrial eye shield comprising a molded, plastic, flexible frame having lens openings therein with gripping means disposed within the openings to grip marginal edges of a lens when the frame and lens are flexed with respect to each other, the gripping means being disposed below the frontal plane of the frame.

Still another object of the invention is the provision of an industrial eye shield having a one-piece flexible molded plastic frame in combination with lenses which readily can be locked into suitable openings in the frame between gripping means in lens-receiving openings and in which the lenses are non-circular, planular and interchangeable with respect to each other and the lens-holding openings.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following detailed description taken in connection with the accompanying drawing, in which:

Fig. 1 is a front elevational view of a preferred embodiment of the invention illustrating a one-piece molded, flexible frame with lenses positioned therein;

Fig. 2 is a transverse sectional view, taken along the lines 2—2 of Fig. 1, looking in the direction of the arrows;

Fig. 3 is a fragmentary sectional view, taken along the lines 3—3 of Fig. 1;

Fig. 4 is a fragmentary sectional view, taken along the lines 4—4 of Fig. 1; and Fig. 5 is a fragmentary sectional view illustrating a modified form of lens which can be utilized in connection with the present invention.

Referring more particularly to Fig. 1 of the drawing, there is illustrated generally at 10 a preferred embodiment of an industrial eye shield contemplated by the present invention. The eye shield consists of a frontal area of two sections 11 and 12 connected by a nose bridge. The remaining frame structure is backwardly curved from the frontal sections as at 13, 13. The upper portion, including the sides of the backwardly curved area, as well as the lower portion, indicated generally at 14, are contoured snugly to fit substantially closely around the eyes of the wearer of such a protective device.

Within the frontal sections 11 and 12 are lens-receiving openings carrying lenses 15, 15. These lenses preferably are of non-circular shape. Each lens is held in position by gripping means in the shield composed preferably of a recessed portion provided by each lens opening having one or more ledges 16, 16, which are directed inwardly of the center of the openings 15, 15. These ledges are adapted to receive the lenses 15 at one or more marginal points to support them in an operative position.

Projections 17, 17, also inwardly directed with respect to each of the lens-holding openings, are adapted to bear against marginal portions of the opposite face of each lens seated within its respective opening to hold the same in locked position. The edge of each lens should be of such thickness that it can be carried firmly between the ledges 16, 16 and the projections 17, 17. Preferably, these ledges and projections are staggered with respect to each other, that is, the projections 17, 17 are so located that they overlie the spaces between adjacent ledges 16, 16, thereby providing a novel lens gripping means and lens holding groove.

The lenses 15, 15, as illustrated, are made of planular, flexible material. They can readily be interlockingly snapped into place by inserting the narrow end of the lens toward the bridge, or nose piece, and marginally against one of the ledges 16, 16, but underneath the adjacently overlying projections 17, 17. If the lens is made of plastic it may readily be flexed into position by pressing the broader part downwardly while at the same time slightly flexing the area around the lens-receiving opening so that the lens is flexed with respect to the frame. The remaining portion of the lens can then be snapped into position against the remaining ledges 16, 16 and underneath the remaining projections 17, 17. Even when the lenses are not flexible because of added protective thickness, or because they are made of glass, or the like, the frame can be flexed and the lens snapped into position.

It should be observed that the ledges as well as the effective portions of the projections are disposed below the frontal plane of the frame.

It should also be noted that by these arrangements non-circular and planular lenses are interchangeable with respect to the right and left openings and can readily be inserted by a user of such a device.

In Fig. 5 there is shown a similar type of frame carrying a lens 18 of greater thickness which is more suitable in providing increased protective characteristics. Such a lens may also be made of ordinary glass and can conveniently be beveled as at 19 so as to be marginally gripped by the projections 17, 17, and seated against the ledges 16, 16.

Head straps 20 hold the shield in protective position.

Ventilating ports 21 can also be used to advantage.

The particular device herein described has many other advantages. For example, any suitable type of lens of the kind described can be utilized, whether made of glass or plastic, and they can readily be snapped into and out of operative position by the user of the device. Also, the staggered ledges and projections are advantageous in the molding operations of such a device. Any desirable color of glass or plastic lenses, including any suitably colored frames, can be used.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An industrial eye shield, which comprises a resilient plastic frame, said frame having a frontal section with lens-receiving openings therein, said frontal section, around each lens-receiving opening, having a plurality of spaced apart inner ledges extending generally toward each other on the inside of the frame and adapted to support a lens in each opening along marginal portions of an inner surface of each lens, said frontal section, around each lens-receiving opening, also having a plurality of spaced apart outer projections extending generally toward each other on the outside of the frame, said outer projections overlying the spaces between said inner ledges and adapted to maintain the lens in locked position in each opening and in abutting relation against said inner ledges by pressing against marginal portions of the opposite surface of each lens after an edge of a lens is inserted in each opening between said ledges and said projections and the frame is flexed so that the lens can be sprung into the opening and positioned therein.

2. An industrial eye shield, which comprises in combination a resilient plastic frame and a resilient plastic lens, said frame having a frontal section with lens-receiving openings therein, said frontal section, around each lens-receiving opening, having a plurality of spaced apart inner ledges extending generally toward each other on the inside of the frame and supporting a lens in each opening along marginal portions of an inner surface of each lens, said front section, around each lens opening, also having a plurality of spaced apart projections extending generally toward each other on the outside of the frame, said projections overlying the spaces between said ledges and maintaining said lens in locked position in each opening and in abutting relation against said ledges by pressure against marginal portions of the opposite surface of each lens after an edge of a lens is inserted in each opening between said ledges and said projections and the lens and the frame are flexed with respect to each other so that the lens can be sprung into the opening and positioned and locked therein.

3. An industrial eye shield, which comprises a single blank of a resilient plastic material, said blank having a frontal section with lens-receiving openings therein and rearwardly extending curved sections extending from the frontal section and terminating in a face-conforming edge, said frontal section, around each lens-receiving opening, having a plurality of oppositely disposed spaced apart inner ledges extending generally toward each other on the inside of the frontal section and adapted to support a lens in each opening along marginal portions of an inner surface of each lens, said frontal section, around each lens-receiving opening, also having a plurality of oppositely disposed spaced apart outer projections extending generally toward each other on the outside of the frame, said projections overlying the spaces between said inner ledges and adapted to maintain a lens in locked position in each opening and in abutting relation against said inner ledges by pressing against marginal portions of the opposite surface of each lens after an edge of a lens is inserted in each opening between said ledges and said projections and the frame flexed so that the lens can be sprung into the opening and locked therein.

ROBERT L. MALCOM.